J. S. TAYLOR.
Can for Baking-Powder.

No. 226,804.  Patented April 20, 1880.

Witnesses:
Wm. F. Clark
J. F. Peacock

Inventor:
James S. Taylor
per Boone & Osborn
Attys.

UNITED STATES PATENT OFFICE.

JAMES S. TAYLOR, OF SAN FRANCISCO, CALIFORNIA.

CAN FOR BAKING-POWDERS.

SPECIFICATION forming part of Letters Patent No. 226,804, dated April 20, 1880.

Application filed February 7, 1880.

*To all whom it may concern:*

Be it known that I, JAMES S. TAYLOR, of the city and county of San Francisco, in the State of California, have invented certain new and useful Improvements in Cans for Containing Baking-Powder; and I do hereby declare that the following is a full, clear, and exact description thereof, reference being had to the accompanying drawings.

The object of my invention is to provide each can in which baking-powder is put up and sold with a measuring-chamber and sieve, so that the powder can be measured and sifted out without removing the top of the can.

I prefer to make this measuring-chamber and sieve a part of the cover of the can; but it could be applied to the bottom or other part of the can. In the present case I have represented it as being made a part of the cover.

Figure 1:
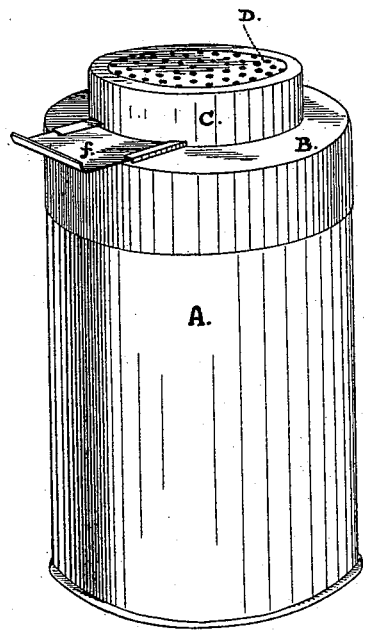
Figure 2:
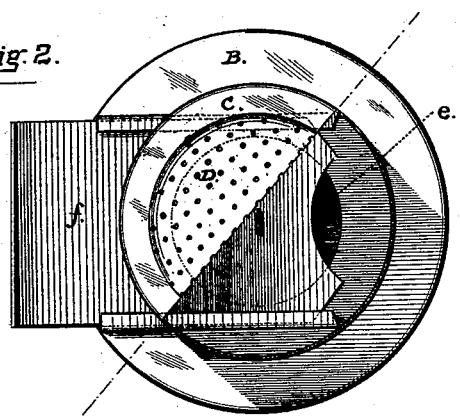

Referring to the accompanying drawings, Figure 1 is a perspective view of my improvement applied to a can. Fig. 2 is a top view of the same, with one-half of the perforated top cut away to show the interior.

Let A represent a can in which baking-powder is put up and sold. Upon the cover B, I form or secure a chamber, C, which has a sieve, D, in its top. An opening, $e$, is made in the top of the cover, leading into this chamber, and a slide, $f$, is arranged to move across the top of the cover and through the side of the chamber, so as to cover or uncover the opening, as desired. When the slide is closed the powder in the can cannot pass into the chamber; but when it is withdrawn, so as to uncover the opening, the powder can pass through into the chamber when the can is turned upside down. This chamber is intended to contain just the quantity of powder which it is necessary to use in a quart of flour.

To fill this chamber, place the hand or a supplemental cover over the sieve, and, after withdrawing the slide, invert the can or vessel, when the powder will enter said chamber. The slide is then pushed in, closing the communication between the said chamber and the can, when the latter can be reversed to cause it to assume its normal position, with the said chamber filled with and holding the desired quantity of the powder or contents of the vessel ready for sprinkling or dredging.

By this arrangement it will not be necessary to remove the cover from the can until the powder is entirely used up, thus keeping it clean, and saving a considerable quantity which is ordinarily thrown out by the action consequent upon and in pulling off a tight cover. The powder is also more thoroughly distributed in the flour by the sieve than when it is thrown from a spoon in the usual way, and, besides, this arrangement avoids the liability of injuring the powder by inserting a damp spoon into it.

Having thus described my invention, what I claim, and desire to secure by Letters Patent, is—

1. The vessel or receptacle provided with a supplemental communicating chamber, in combination with the sieve D and slide $f$, substantially as and for the purpose set forth.

2. The combination, with the cover B of a receptacle or vessel having the superposed chamber C, of the sieve D and slide $f$, substantially as and for the purpose set forth.

In witness whereof I have hereunto set my hand and seal.

JAMES S. TAYLOR. [L. S.]

Witnesses:
J. L. BOONE,
EDWARD E. OSBORN.